W. M. HEINA.

JOURNAL OR AXLE BEARING.

APPLICATION FILED AUG. 20, 1920.

Reissued Mar. 8, 1921. 15,058.

Inventor:
William M. Heina
By his Attys:
Philip Jacque Rice Kennedy

UNITED STATES PATENT OFFICE.

WILLIAM M. HEINA, OF NEW YORK, N. Y., ASSIGNOR TO JOHN PLATT, OF WESTFIELD, NEW JERSEY.

JOURNAL OR AXLE BEARING.

15,058. Specification of Reissued Letters Patent. Reissued Mar. 8, 1921.

Original No. 1,288,581, dated December 24, 1918, Serial No. 205,774, filed December 6, 1917. Application for reissue filed August 20, 1920. Serial No. 405,361.

*To all whom it may concern:*

Be it known that I, WILLIAM M. HEINA, a citizen of the United States, and a resident of the city of New York, in the county of New York and State of New York, have invented a new and Improved Journal or Axle Bearing, of which the following is a full, clear, and exact description.

This invention relates to journal or axle bearings and has particular reference to bearings of the smooth or plain type as distinguished from so-called anti-friction or roller bearings.

Among the objects of the invention is to provide a bearing construction that is as nearly frictionless as it is possible to make a bearing in which there is sliding contact between adjacent parts.

Another object of the invention is to provide a bearing having maximum strength for the purpose of resisting or supporting either end thrust or lateral loads, whereby the bearing is adapted for use in such places as railway car or locomotive journals, steering knuckles of heavy motor trucks, or the like, where so-called anti-friction roller bearings are subjected to crushing strains. In other words I aim to provide a bearing of maximum strength and very little friction, if any, without any possibility of such breakage as is so likely to disable a bearing of the roller bearing type.

A further object of the invention is to provide a journal or axle bearing including a multiplicity of relatively movable elements so arranged for relative rotation around a common axis and movable relatively to one another in such a manner that the relatively high angular speed between the wheel and axle for example is reduced or equalized among all of the several elements of the bearing between no adjacent two of which the relative angular velocity can be excessive.

Another object of the invention is to provide a bearing of the plain or smooth type in which there are a multiplicity of coaxial bearing elements one of which is relatively stationary, another of which is connected to the high speed moving part, and the intermediate plurality are free for relative movement each to each so that a relatively high angular velocity of the rotating part is practically equally divided among the contacting surfaces of each adjacent pair of bearing elements.

A still further object of the invention is to provide for a wheel and axle or analogous relatively rotating parts, a combined lateral and thrust bearing or one which is adapted to resist all friction or nearly all friction resulting from relative movement of the two parts in any direction.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a vertical longitudinal section of one form of my invention shown as applied to a wheel and steering knuckle of a motor car, this form of the invention typifying the combined lateral and thrust bearing features above referred to.

Figure 1:
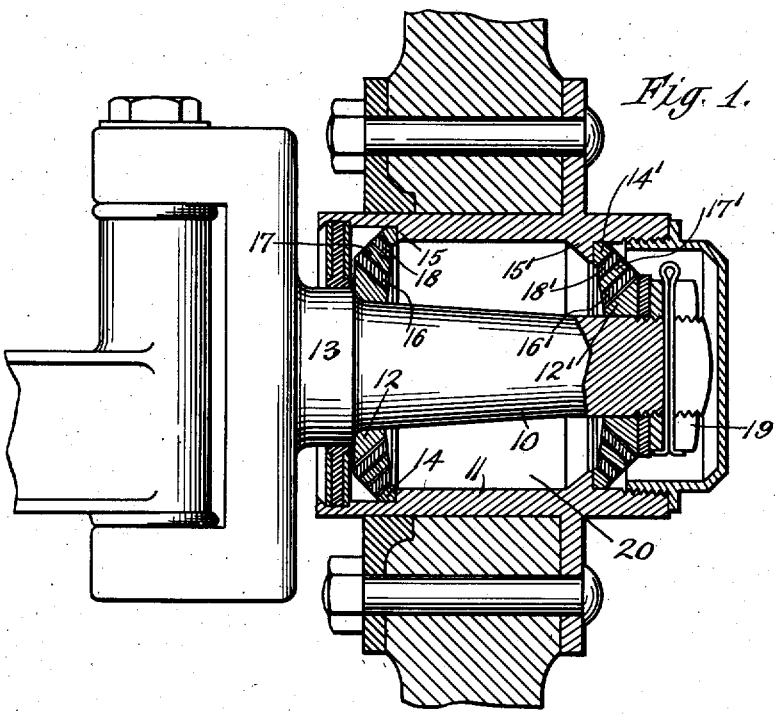

Referring now more particularly to Fig. 1 I show at 10 and 11 relatively stationary and rotary members, the same being indicated as an axle and wheel hub, respectively, but with respect to the particular members it is to be understood that my improvement is adapted for use in connection with any two relatively rotatable members. For the purpose, however, of typifying the combined lateral and thrust functions of the improvement I show my improved bearing as being duplicated in opposite ends of the hub so as not only to adapt the improvement to this particular use, but also to provide a grease space or chamber between the two bearings.

As above premised each bearing construction includes a multiplicity of coaxial smooth faced bearing elements shown in this instance as five in number, the innermost element 12 being fitted or otherwise carried upon the axle 10 against a shoulder 13 and hence held normally from rotation. The outermost element 14 is likewise fitted against a shoulder 15 near the inner end of the hub. The elements 16, 17 and 18 constitute a plurality of loose smooth faced elements interposed between the innermost and outermost elements 12 and 14, each of the intermediate elements being free to rotate independently of either element on either side thereof. These coaxial annular bearing elements are formed of material thickness and hence are strong and rigid and able to withstand all reasonable service and resist any force or pressure applied thereto from any direction. While I am not to be restricted in the scope of this specification to any particular materials I prefer to form the bearing elements of different materials so that no two adjacent elements of the same material will be in contact. For example the elements 12, 14, and 17, may be of steel, while the elements 16 and 18 sandwiched between them may be of bronze or some other suitable bearing metal.

As indicated the intermediate elements 16, 17 and 18 are each in the form of a hollow frustum of a cone, the wall of each of which is preferably of uniform thickness. In other words the inner and the outer surfaces of each element are parallel and for the best service for lateral and thrust purposes the geometric elements of each bearing element are all arranged, both on the inner and the outer surfaces, at approximately forty-five degrees to the axis of the shaft or axle. Arranged as thus indicated there is little or no tendency for the adjacent or contacting surfaces of adjacent elements to bind or wedge when subjected to pressure from any direction. Furthermore, by making the intermediate or shell elements each of uniform thickness throughout, said elements are much better adapted for interchange or interfitting at the time of assemblage or reassemblage of the bearings.

The various elements of each bearing assemblage are shorter in extent with respect to the longitudinal axis of the shaft as the distance thereof increases from the center of the shaft. It follows from this construction that while the radius increases, the bearing surface remains approximately the same by reason of the fact that the inner elements are provided with longer or wider bearing surfaces. Considering an inner wider bearing surface, for instance, as S and an outer bearing surface, as $s$, while the mean larger radius is represented by R and the mean smaller radius as $r$, the foregoing fact of construction may be stated in the form of a proportion as follows: $S:s::R:r$. From this it will appear that with the several pairs of contacting surfaces approximately equal and subjected to equal strains or forces, the actual friction on the several pairs of surfaces ought to be equal. Therefore, while the element 14 carried by the hub may be considered as having a high relative speed of rotation around the axle, the element 18 adjacent thereto will have a lower speed of rotation due to the drag or retardation incident to the next inner element 17. In other words it may be stated as a principle that any element free to rotate independently of all of the others will have a relatively low disparity of speed with respect to either element adjacent thereto on either side thereof even though one of the elements may have a very high absolute rate of speed. It follows, therefore, that in bearings subjected to thousands of revolutions per minute as is true in modern high speed engines I am able to produce a smooth bearing adapted to so subdivide or distribute the bearing speed among the several elements as to practically offset any tendency to excessive heating and disability of the bearing. I will point out also as a subsidiary feature of the construction that the wider inner elements of the structure tend to produce the maximum strength in proportion to the amount of material employed in the assemblage. In other words the innermost element 12 may be regarded as a wide base upon which upper or outer elements are built or supported.

The bearing structure at the outer end of the hub is essentially the same as has already been described and hence the corresponding elements are similarly indicated although the structure is slightly smaller. The innermost element 12′ while not presumed to rotate upon the axle is yet movable longitudinally thereof under the force of the adjustment nut 19 coöperating with the outer end of the axle in any usual or approved manner for the purpose of holding the wheel in place on the axle and maintaining the proper adjustment of the bearing elements each to each. The outermost element 14′ is fitted in the outer end of the hub against a shoulder 15″ and the intermediate plurality of relatively free elements 16′, 17′ and 18′ are arranged and constructed substantially as heretofore explained in connection with the other end of the hub, with, however, the direction of inclination of the geometric elements opposite to that of the first mentioned bearing. It will be noted that a space 20 is provided between the two bearing assemblages which may be filled or partially filled with any suitable grease or lubricant of such a nature as to be carried therein for the purpose of lubricating all of the bearing surfaces indicated.

Figure 2:
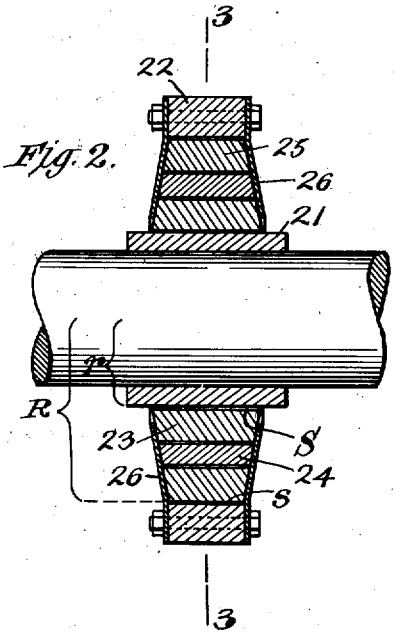
Fig. 2 is a central longitudinal section of another form of my improvement.
Figure 3:
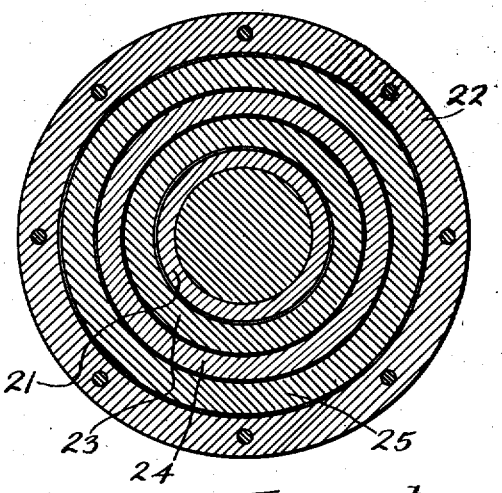
Fig. 3 is a vertical transverse section of the same on the line 3—3.

Figs. 2 and 3 illustrate the same general arrangement in which there are a multiplicity of coaxial bearing elements 21, 22, 23, 24 and 25 illustrated, the same corresponding broadly to the elements 12 to 18 respectively of the other type, that is to say, each outer element has a narrower or shorter bearing surface the extent of which is inversely proportional approximately to the varying radius thereof from the axis of the system. The type of bearing now referred to is strictly for resisting radial loads or pressures and hence it is not designed to resist end thrusts. Any suitable means, however, such as guards 26 may be carried by any element such as 22 to prevent the loose intermediate elements from becoming displaced accidentally.

I claim:

1. The herein described shaft or axle bearing, the same comprising a multiplicity of rigid annular members arranged for relative rotation around a common axis, each member having movable contact with the next adjacent member, and each two contacting members being of different materials.

2. In a shaft or axle bearing, the combination with two members between which there is relative rotation at high speed, of a multiplicity of bearing elements interposed between said members, one element being secured to one of said members while the element at the opposite end of the series is secured to the other member, and the remaining elements being free to rotate with respect to one another and the first and last elements whereby the aforesaid high speed between the members is distributed equally among the several pairs of contacting bearing surfaces of all of the multiplicity of elements.

3. The combination with an axle and a wheel mounted for relative rotation around the axis thereof at high speed, of a series of annular bearing elements interposed between the axle and the wheel, one of said elements being carried by the axle, another being carried by the wheel, and a plurality of said elements being interposed between the axle and wheel elements and adapted for free rotation with relation to one another and the axle and wheel members, whereby the high speed of rotation of one member with respect to the other is subdivided and reduced as between any two adjacent contacting bearing elements.

4. In a shaft or axle bearing, the combination with an axle and a wheel between which there is high speed of relative rotation, of a multiplicity of coaxial smooth faced bearing elements interposed between the axle and the wheel, one of the elements being carried by the axle, another of the elements being carried by the wheel, and a plurality of the elements being arranged between the axle and wheel elements, said last mentioned elements being free to rotate with relation to one another and the other elements and members, and each two adjacent contacting bearing elements being of different materials.

5. The herein described axle or shaft bearing comprising a multiplicity of smooth faced coaxial bearing elements, the several pairs of contacting surfaces between adjacent elements being of different radii from the axis and the extent or area of contact surface at each pair being approximately equal to that of any other pair.

6. The herein described shaft or axle bearing comprising a multiplicity of smooth faced coaxial bearing elements, the several pairs of contacting surfaces between adjacent elements being at progressively greater distances from the axis of the shaft toward the outermost element, while the length of the bearing surface parallel to the axis is progressively greater toward the innermost element.

7. The herein described axle or shaft bearing comprising a multiplicity of coaxial bearing elements of different radii, the several elements being so constructed and designed that the wear incident to the bearing will be substantially equally distributed among all pairs of contact surfaces.

8. In a bearing, the combination with two members, of a multiplicity of bearing elements interposed between said members, said members rotating relatively to each other, and said elements being arranged to distribute the relative rotational speed of said two members substantially equally among the several pairs of contacting bearing surfaces of the bearing elements.

9. In a combined lateral and thrust bearing, the combination, with the relatively stationary and rotary members each carrying a unitary combined lateral and thrust bearing surface, of a plurality of intermediate annular coaxial bearing elements having unitary combined lateral and thrust bearing surfaces of different radii, said elements being arranged to move between the respective bearing surfaces carried by the stationary and rotary members and to transmit lateral and thrust loads on the rotary member to the stationary member.

10. In a combined lateral and thrust bearing, the combination, with the relatively stationary and rotary members each carrying a unitary combined lateral and thrust bearing surface, of a plurality of intermediate annular coaxial bearing elements having unitary combined lateral and thrust surfaces of different radii arranged to support lateral and thrust pressure, said elements being arranged to move between the respective bearing surfaces carried by the stationary and rotary members and to transmit lateral and thrust loads on the rotary member to the stationary member, the total lengths of the respective bearing surfaces, measured in the direction of the axis of the rotary member, decreasing with increase of the respective distances of such bearing surfaces from such axis.

11. In a combined lateral and thrust bearing, the combination, with the relatively stationary and rotary members carrying coned bearing surfaces, of a plurality of intermediate annular coaxial bearing elements naving coned bearing surfaces of different radii, said elements being arranged to move between the respective coned bearing surfaces carried by the stationary and rotary members and to transmit lateral and thrust loads on the rotary member to the stationary member.

12. In a combined lateral and thrust bearing, the combination, with the relatively stationary and rotary members carrying coned bearing surfaces, of a plurality of intermediate annular coaxial bearing elements having coned bearing surfaces of different radii, said elements being arranged to move between the respective coned bearing surfaces carried by the stationary and rotary members and to transmit lateral and thrust loads on the rotary member to the stationary member, all the coned bearing surfaces having an angle of substantially 45° relative to the axis.

13. In a combined lateral and thrust bearing, the combination, with the relatively stationary and rotary members each carrying a pair of oppositely sloped coned bearing surfaces, of a plurality of intermediate annular coaxial bearing elements having two sets of coned bearing surfaces of different radii, the slope of the coned surfaces of one set being opposite to that of the other set, said elements being arranged to move between the respective coned bearing surfaces carried by the stationary and rotary members and to transmit lateral and thrust loads in either direction on the rotary member to the stationary member.

14. In a combined lateral and thrust bearing, the combination with the relatively stationary and rotary members, each carrying a pair of oppositely sloped coned bearing surfaces, of two sets of intermediate annular coaxial bearing elements having coned bearing surfaces of different radii, the slope of the coned surfaces of one set being opposite to that of the other set, said elements being arranged to move between the respective coned bearing surfaces carried by the stationary and rotary members and to transmit lateral and thrust loads in either direction on the rotary member to the stationary member, the two sets of bearing elements being spaced apart to form a chamber for lubricant between the sets.

In witness whereof I have hereunto set my hand and seal.

WILLIAM M. HEINA. [L. S.]